Aug. 1, 1967  R. G. HOLLINGER  3,333,881

LAWN GROOM

Filed March 25, 1965  2 Sheets-Sheet 1

INVENTOR.
RICHARD G. HOLLINGER
BY
Donnelly, Mentag & Harrington
ATTORNEYS

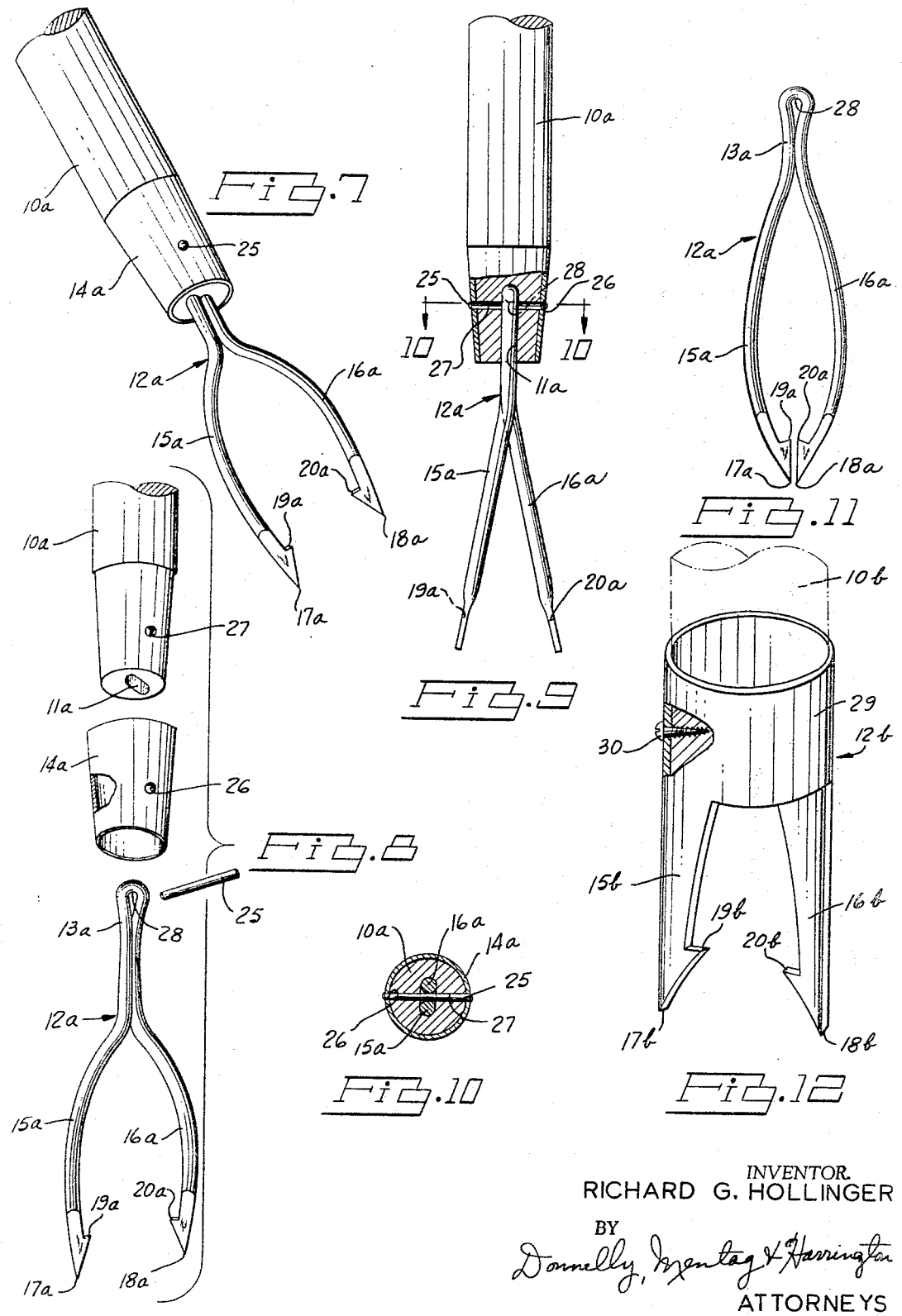

United States Patent Office 3,333,881
Patented Aug. 1, 1967

3,333,881
LAWN GROOM
Richard G. Hollinger, 10745 Kingston,
Huntington Woods, Mich. 48070
Filed Mar. 25, 1965, Ser. No. 442,591
2 Claims. (Cl. 294—19)

This invention relates generally to garden tools, and more particularly to an improved garden tool for grooming lawns.

Heretofore, garden tools have been provided for weeding lawns and transplanting grass plugs. However, these prior art garden tools have many disadvantages. For example, the prior art weed pulling tools remove a large amount of ground with the weed and thereby leave a large hole in the ground. Another disadvantage is that garden tools for transplanting grass plugs remove a large portion or plug of grass, which leaves the grass spotted with large holes. Accordingly, it is an important object of the present invention to provide a novel and improved lawn grooming tool which is adapted to overcome the aforementioned disadvantages of the prior art lawn grooming tools.

It is another object of the present invention to provide a novel and improved lawn grooming tool which is adapted to pull weeds out by the roots without removing a large amount of ground with the roods.

It is a further object of the present invention to provide a novel and improved lawn grooming tool which may be used to transplant small plugs of grass in a fast and efficient manner.

It is still another object of the present invention to provide a novel and improved garden tool which may be used for picking up trash and aerating a lawn.

It is still a further object of the present invention to provide a novel and improved garden tool which is simple and compact in construction, economical to manufacture, and efficient in operation.

It is another object of the present invention to provide a lawn grooming tool which includes a handle, a head fixed on the lower end of said handle and comprising, a pair of spaced apart prongs which are each provided with a hook on the lower end thereof, and which hooks are disposed in opposite directions.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 7 is a fragmentary, perspective view of a second embodiment of the invention;

FIG. 8 is an exploded view of the second embodiment illustrated in FIG. 7;

FIG. 9 is a side elevational view of the lower end of the second embodiment illustrated in FIG. 7 and showing the tool with parts removed and parts in section;

FIG. 10 is a horizontal sectional view of the structure illustrated in FIG. 9, taken along the line 10—10 thereof, and looking in the direction of the arrows;

FIG. 11 is an enlarged side elevational view of the prong structure employed in the embodiment of FIG. 7; and, FIG. 12 is a perspective view of a third embodiment of the invention.

Figure 1:
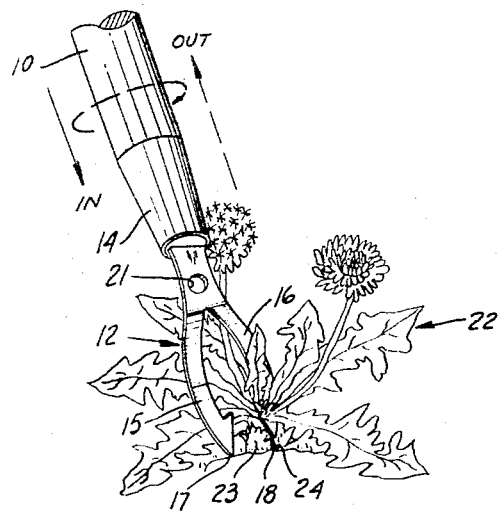
FIG. 1 is a fragmentary, perspective view of a garden tool made in accordance with the principles of the present invention.
Figure 2:
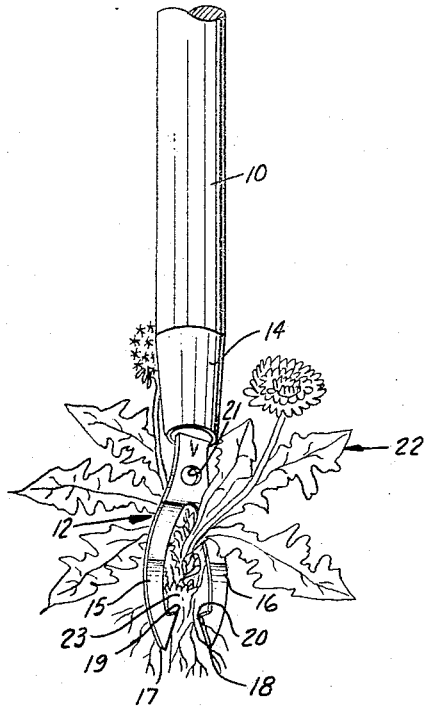
FIG. 2 is a fragmentary, perspective view of the garden tool illustrated in FIG. 1, showing a weed in a removed condition and as gripped by the garden tool.
Figure 3:
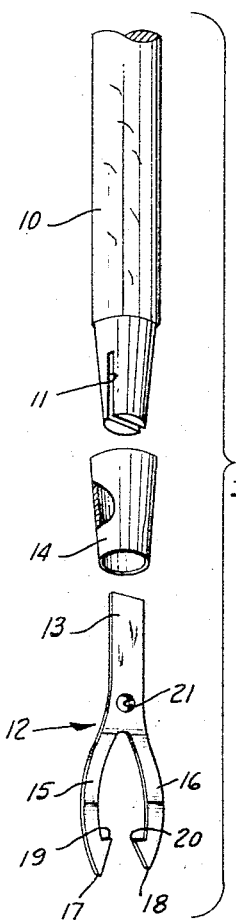
FIG. 3 is an exploded view of the garden tool illustrated in FIG. 1, showing the parts of the tool in a disassembled condition.

Referring now to the drawings, and in particular to FIGS. 1, 2 and 3, the numeral 10 designates the handle of a first embodiment of the invention. The lower end of the handle is formed in the shape of a truncated cone and is provided with the mounting slot 11 which extends axially of the handle 10, and in which is received the carrier plate 13 of the tool head generally indicated by the numeral 12. The carrier plate 13 is retained in the slot 11 by means of the tubular truncated cone-shaped retainer 14 which functions to create a sidewardly directed prsessure against the carrier plate 13 to retain the plate in the slot 11. The tubular retainer 14 is mounted on the truncated cone-shaped end of the handle 10 by a force fit.

Figure 4:
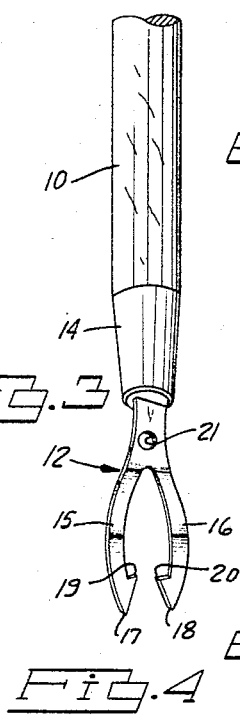
FIG. 4 is a fragmentary, perspective view of the tool illustrated in FIG. 1.
Figure 5:
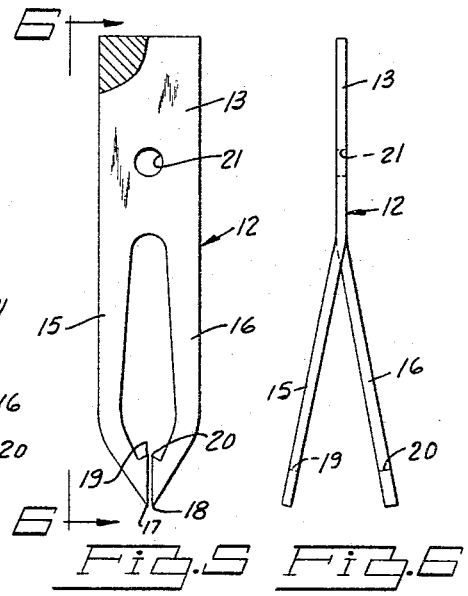
FIG. 5 is an elevational view of the prongs on the head of the tool.
Figure 6:
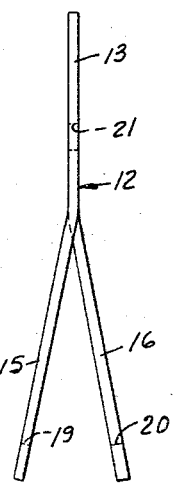
FIG. 6 is a side elevational view of the tool structure illustrated in FIG. 5, taken along the line 6—6 thereof, and looking in the direction of the arrows.

As shown in FIGS. 2–5, the garden tool of the present invention further includes a pair of prongs or spikes 15 and 16 which are integrally connected at the upper ends thereof to the lower end of the carrier plate 13. The lower ends of the prongs 15 and 16 are provided with the points 17 and 18, and the hooks 19 and 20, respectively. The carrier plate 13 is provided with a hole 21 for hanging the tool on a nail in a garage or the like. It will be seen that the hooks 19 and 20 are disposed in an opposite position so that they face each other. FIG. 5 illustrates the oppositely disposed positions of the hooks 19 and 20. FIGS. 4 and 6 illustrate the curved structure of the prongs 15 and 16, and the laterally spaced apart, relative positions of the prongs 15 and 16. It will be seen that the prongs 15 and 16 are spaced apart laterally or sidewardly from each other, but it is not necessary that they be spaced apart along the axis which would be disposed 90° to the sideward spacing axis shown in FIG. 6.

FIG. 1 illustrates the use of the lawn grooming tool of the present invention. The tool is first disposed at an angle to the level of the ground 24, and the prongs 15 and 16 are disposed in a position adjacent the root 23 of the weed 22 so as to straddle the root 23. The operator then pushes downwardly on the handle 10 until the prongs 15 and 16 have fully entered the ground and are disposed on opposite sides of the root 23. The handle 10 is then moved with a twisting or rotating motion, as shown by the dotted circular arrow and line in FIG. 1. Simultaneously, the operator pulls upwardly and outwardly on the handle 10. The hooks 19 and 20 engage the root 23 of the weed during the twisting-pulling-removing action, and the weed is quickly and efficiently removed from the ground with a minimum of dirt attached to the root of the weed. An advantage of the garden tool of the present invention is its ability to perform its function without removing a large quantity of dirt. Another advantage is that the tool does not leave a large hole in the ground as do the prior art weed removing devices.

The garden tool of the present invention is also adapted for other lawn grooming operations. For example, the pointed ends 17 and 18 on the prongs 15 and 16, respetively, permit the tool to be used for making holes in the lawn for aerating the same, and also for picking up trash. The garden tool of the present invention may also be used to transplant plugs of different types of grass, as for example, creeping bent, zoysa, and Bermuda grass. The prongs 17 and 18, and the hooks 19 and 20 combine to provide a garden tool with which small plugs of grass may be quickly and easily removed from a good portion of a lawn and quickly and easily transplanted in a new location without removing the plug of grass from the tool before inserting it into the ground. The plug of grass may be attached to the prongs 15 and 16 by the aforedescribed action for removing a weed. The only difference is that instead of a weed a small plug of grass is removed which can be transplanted into the ground at the desired location, by reversing the removing action. The removal of small plugs of grass for transplanting purposes permits all transplanting operations to be carried out without leaving unsightly large holes in the grass where transplanted plugs of grass have been removed.

The tool head 12 may be made from any suitable material, as for example, spring steel.

FIGS. 7–11 illustrate a second embodiment of the invention. The parts of the second embodiment which are the same as the parts of the first embodiment of FIGS. 1–6 have been marked with corresponding reference numerals followed by the small letter "a." In the second embodiment, the tool head 12a is formed from a length of wire rod which has been folded over on itself to provide the attachment loop 28, the carrier portion 13a, the spaced apart prong 15a and 16a, the points 17a and 18a, and the hooks 19a and 20a.

As best seen in FIG. 11, the prongs 15a and 16a are pinched together near the upper ends thereof, as shown by the numeral 13a, and this portion corresponds to the mounting or carrier plate portion 13 of the first embodiment. The carrier portion 13a is adapted to be mounted in the slot 11a as shown in FIG. 8. The tool head 12a is retained in the slot 11a of the carrier portion by the retainer pin 25 which passes through the holes 26 that are in the retainer portion 14a and the hole 27 in the lower end of the handle 10a. The retainer pin 25 passes through the loop 28 on the upper end of the tool head 12a. The tool head 12a may be made from spring steel or any other suitable material. It will be seen that the hooks 19a and 20a are disposed in a position whereby they face each other in the same manner as the embodiment of FIG. 1. The second embodiment of FIGS. 7–11 operates in the same manner as described hereinbefore for the embodiment of FIGS. 1–6.

FIG. 12 illustrates a third embodiment of the invention. The third embodiment is made from a piece of tubular material which includes an upper tubular carrier portion 29 secured to the lower end of the handle 10b by any suitable means, as for example by screws 30. An integrally formed set of prongs are provided on the lower end of the tubular carrier member 29 and they extend downwardly and are indicated by the numerals 15b and 16b. The prongs 15b and 16b are formed on diametrically opposite sides of the tubular carrier member 29. The prongs 15b and 16b are provided with the points 17b and 18b, and the hooks 19b and 20b, respectively. The embodiment of FIG. 12 functions in the same manner as described hereinbefore for the embodiment of FIGS. 1–6.

Experience has shown that the lawn grooming tool of the present invention is a practical and efficient garden tool for removing weeds, transplanting plugs of grass, picking up trash, and aerating the lawn. Although the prongs have been shown as evenly spaced apart, it will be understood that they could be unevenly spaced apart. For example, one prong could be vertical and the other spaced outwardly therefrom at an angle from the vertical.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:
1. A garden tool comprising:
 (a) a handle;
 (b) a pair of laterally spaced apart twisted gripping prongs lying in different planes on one end of said handle; and,
 (c) said prongs having uninterrupted opposed edges and being provided with a pair of oppositely disposed barb-like hooks at the terminal ends of the prongs which are adapted to grip an object positioned between the prongs when the prongs are disposed in a position straddling the object and are rotated to bring the barb-like hooks into gripping engagement with the object.
2. A garden tool as defined in claim 1, wherein:
 (a) said prongs are integrally formed on the lower end of a carrier plate retained on the lower end of said handle.

References Cited
UNITED STATES PATENTS

| | | | |
|---|---|---|---|
| 1,079,619 | 11/1913 | Walton | 294—50.6 |
| 1,178,015 | 4/1916 | Holmden | 294—19 |
| 1,924,002 | 8/1933 | Rush | 294—50.6 |
| 2,057,067 | 10/1936 | Smith | 294—50.7 |
| 2,317,801 | 4/1943 | Power | 294—50.6 |
| 3,198,719 | 8/1965 | Stewart | 294—50.5 |

M. HENSON WOOD, JR., *Primary Examiner.*

C. H. SPADERNA, J. N. ERLICH, *Assistant Examiners.*